United States Patent Office 3,227,628
Patented Jan. 4, 1966

3,227,628
STABILIZATION OF ACRYLIC MONOMERS
Lawrence G. Hess, Charleston, W. Va., assignor to Union Carbide Corporation, a corporation of New York
No Drawing. Filed May 16, 1963, Ser. No. 281,006
5 Claims. (Cl. 260—348)

This invention relates to a method of inhibiting polymerization during the refining of acrylic monomers and to stabilized acrylic monomer compositions. More particularly, this invention relates to the addition of minor amounts of certain conjugated polyenes to acrylic monomers as inhibitors of popcorn polymerization during the distillation thereof.

Acrylic monomers, that is acrylic acid, methacrylic acid, and derivatives thereof, are of great commercial importance, being employed to prepare homopolymers and copolymers having a wide variety of uses. The acrylic monomers are produced by various well-known processes, for example, the production of esters of acrylic acid by heating ethylene cyanohydrin with sulfuric acid and an alcohol, and are generally refined by distillation techniques. Because of the pronounced tendency of acrylic monomers to spontaneously polymerize, particularly at elevated temperatures, the distillation is normally carried out under reduced pressures so as to keep the temperature as low as possible.

During the reduced pressure distillation of acrylic monomers, vinyl-type polymerization, that is, the normal type of addition polymerization of acrylic monomers which produces an essentially linear polymer which generally is soluble in the monomer, is customarily prevented by addition to the still column of minor amounts of any of several polymerization inhibitors, for example, phenothiazine, hydroquinone, or the monomethyl ether of hydroquinone. However, during distillation, acrylic monomers tend to also undergo a different type of polymerization which is not inhibited by compounds which prevent vinyl-type polymerization. This spontaneous polymerization, which occurs concurrently with vinyl-type polymerization, results in the formation of a highly insoluble voluminous polymer which is believed to consist of a series of very long chains connected by infrequent cross-links. Because of the resemblance of the porous, bulky, insoluble polymer to popcorn, this type of polymerization is often termed "popcorn polymerization" and is hereinafter referred to in this manner.

Popcorn polymerization presents a very serious problem in the commercial production of acrylic monomers. The popcorn polymer is insoluble in both the acrylic monomer and in many common solvents and it occupies much larger volumes than the liquid monomer from which it is derived. Furthermore, the popcorn polymer catalyzes further polymerization of the acrylic monomer, even in the presence of inhibitors for vinyl-type polymerization, so that when popcorn polymerization is once initiated, the voluminous polymer quickly plugs the equipment, requiring a shut-down and an expensive and laborious clean-up before operation can be resumed. With acrylic monomers which are particularly prone to undergo popcorn polymerization, for example, glacial acrylic acid and polyfunctional acrylic esters such as glycidyl acrylate, 2-cyanoethyl acrylate or 2-hydroxyethyl acrylate, the problem can be an even more serious one. Such monomers are usually distilled under as low a reduced pressure as possible in order to keep the temperature to a minimum, however, the pressure drop through production scale equipment still results in relatively high temperatures near the base of the still column and in the still kettle so that popcorn polymerization can readily start. Once initiated, the popcorn polymerization can proceed with such rapidity that the bulky polymer can produce pressures sufficient to bulge or crack plant equipment.

Inhibitors capable of preventing popcorn polymerization to some degree are known to the art. Thus, both para-nitrophenol and nitric oxide have been used in the past for this purpose, usually in conjunction with the hereinbefore described conventional inhibitors for vinyl-type polymerization of acrylic monomers. These inhibitors of popcorn polymerization suffer from serious disadvantages however. Neither para-nitrophenol nor nitric oxide is highly effective as an inhibitor and both tend to impart an undesirable yellowish coloration to the acrylic monomer. Furthermore, initiation of popcorn polymerization is known to occur in both the vapor and liquid phases in a distillation column and it is most difficult to adequately distribute para-nitrophenol, a solid at the temperatures usually encountered in distillation of acrylic monomers, throughout the vapor phase.

The present invention, which provides a highly effective technique whereby acrylic monomers can be distilled without the occurrence of popcorn polymerization, encompasses both a method of stabilizing acrylic monomers and the stabilized compositions resulting therefrom. In the method of this invention, acrylic monomers are stabilized against popcorn polymerization at elevated temperatures by intimately admixing therewith minor amounts, sufficient to prevent popcorn polymerization, of certain conjugated polyenes. The discovery that the conjugated polyenes disclosed herein are effective inhibitors for popcorn polymerization was indeed surprising in view of the fact that there are numerous disclosures in the technical literature of the reaction of polyenes with acrylic monomers. The conjugated polyenes that have been found to be of utility as inhibitors of popcorn polymerization in acrylic monomers are the aliphatic hydrocarbons having at least three conjugated double bonds in the molecule thereof and containing at least 7 and up to 12 carbon atoms. By the term "aliphatic hydrocarbons" as used herein is meant acyclic and alicyclic compounds composed solely of carbon and hydrogen.

Illustrative of the suitable conjugated polyenes one can mention:

1,3,5-heptatriene,
2-methyl-1,3,5-hexatriene,
3,4-dimethyl-1,3,5-hexatriene,
2-methyl-1,3,5-heptatriene,
4-methyl-1,3,5-heptatriene,
5-methyl-1,3,5-heptatriene,
2,6-dimethyl-1,3,5-heptatriene,
2,4,6-octatriene,
4-methyl-3,5,7-octatriene,
2,6-dimethyl-2,4,6-octatriene,
2,7-dimethyl-2,4,6-octatriene,
3,7-dimethyl-1,3,5-octatriene,
1,3,5,7-octatetraene,
2,6-dimethyl-1,3,5,7-octatetraene,
1,3,5,7-nonatetraene,
3,5,7-decatriene,
2,4,6,8-decatetraene,
1,3,5-dodecatriene,
1,3,5-cycloheptatriene,
1,3,5-cyclooctatriene,
cyclooctatetraene,
and the like.

The conjugated polyenes employed as inhibitors for popcorn polymerization in acrylic monomers according to the method of this invention need not, of course, be pure entities. Thus, the inhibitor can consist of a mixture of two or more of the above-described suitable conjugated polyenes or the conjugated polyenes can be added in a crude form, for exmple, in admixture with minor amounts of hydrocarbons or other inert compounds. The commercially available conjugated polyenes are suitable, for example, commercially available crude 2,6-dimethyl-2,4,6-octatriene, which is reported to contain 95 percent 2,6-dimethyl-2,4,6-octatriene and minor amounts of 2,6-dimethyl-2,5,6-octatriene and dipentene, can be employed.

The acrylic monomers that can be stabilized against popcorn polymerization by the conjugated polyene polymerization inhibitors of this invention are compounds having the general formula:

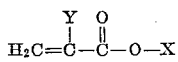

wherein Y is selected from the group consisting of H and $CH_3$; X is selected from the group consisting of H, R,

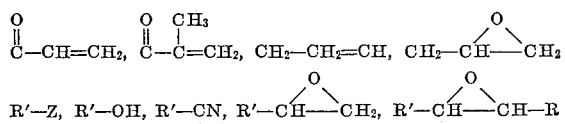

R'—SH, R'—OR, R'—SR, R'—NHR, and R'—NRR (where each of the R groups can be the same or different); R' is an alkylene groups containing from 2 to 4 carbon atoms; Z is a halogen atom; and R is an alkyl group containing from 1 to 4 carbon atoms.

Illustrative of the suitable acrylic monomers, one can mention: acrylic acid, methacrylic acid, methyl acrylate, methyl methacrylate, ethyl acrylate, n-propyl acrylate, isopropyl acrylate, n-butyl acrylate, isobutyl acrylate, chloroethyl acrylate, chloroethyl methacrylate, chlorobutyl acrylate, bromoethyl acrylate, iodoethyl acrylate, fluoroethyl acrylate, acrylic anhydride, methacrylic anhydride, allyl acrylate, allyl methacrylate, hydroxyethyl acrylate, hydroxypropyl acrylate, hydroxybutyl acrylate, hydroxybutyl methacrylate, cyanoethyl acrylate, cyanoethyl methacrylate, cyanobutyl acrylate, glycidyl acrylate, glycidyl methacrylate, 3,4-epoxybutyl acrylate, 2,3-epoxybutyl acrylate, thioethyl acrylate, thioethyl methacrylate, methoxyethyl acrylate, ethoxyethyl acrylate, ethoxyethyl methacrylate, butoxyethyl acrylate, methoxybutyl acrylate, ethoxybutyl acrylate, methylthioethyl acrylate, ethylthioethyl acrylate, ethylthioethyl methacrylate, ethylthiobutyl acrylate, methylaminoethyl acrylate, ethylaminoethyl acrylate, ethylaminoethyl methacrylate, ethylaminobutyl acrylate, diethylaminoethyl acrylate, methylethylaminoethyl methacrylate, and the like.

Generally speaking, the conjugated polyene polymerization inhibitors of this invention are capable of inhibiting popcorn polymerization in the hereinbefore described acrylic monomers during distillation of the acrylic monomers at pressures from subatmospheric to superatmospheric. However, the conjugated polyene polymerization inhibitors are most suitably employed in the distillation of acrylic monomers at reduced pressures, as, for example, the conditions of temperature and pressure normally involved in plant scale distillation of acrylic monomers, that is vapor temperatures of from about 10° C. to about 170° C. and pressures from about 2 to about 700 mm. of mercury. Addition of the conjugated polyene polymerization inhibitors to the distillation system can be carried out in any suitable manner. Thus, for example, the inhibitor can be added to the liquid reflux at the top of the column, or with the feed stream, or to the still kettle. Intimate dispersion of the inhibitor throughout the liquid and vapor phases in the distillation column is desirable so that the preferred method of adding the inhibitor depends on the respective boiling points of the acrylic monomer being processed and the particular inhibitor that is utilized. Thus, if the inhibitor has a lower boiling point than the acrylic monomer, it should preferably be added to the still kettle. Conversely, if the inhibitor has a higher boiling point than the acrylic monomer it should be added near the top of the distillation column.

The conjugated polyenes disclosed herein have been found to essentially completely prevent popcorn polymerization of acrylic monomers over prolonged periods when added to the distillation system in minor amounts, thereby permitting the refining of crude acrylic monomers by continuous distillation techniques without the problems heretofore encountered. The conjugated polyene polymerization inhibitors can be added to the distillation system in an amount from about 5 p.p.m. to about 5000 p.p.m., or more, based on the weight of the acrylic monomer, more suitably in an amount from about 15 p.p.m. to about 500 p.p.m., and preferably in an amount from about 25 p.p.m. to about 150 p.p.m. When the intended end-use of the acrylic monomer being distilled is preparation of a polymer, the amount of inhibitor added to the distillation system should in most cases be kept relatively low, that is, less than about 150 p.p.m., to avoid possible undesirable reduction in the degree of conversion of monomer to polymer. The conjugated polyene polymerization inhibitor can be added to the distillation system alone or along with a minor amount of one of the known inhibitors for vinyl-type polymerization in acrylic monomers, for example, phenothiazine, hydroquinone, or other suitable known inhibitors.

The following examples are given to further illustrate the invention, it being understood that these examples are not intended to be limiting of the invention but merely illustrative thereof.

*Example I*

Glycidyl acrylate was refluxed in a laboratory distillation column operated at an absolute pressure of 28 mm. of mercury and 2,6-dimethyl-2,4,6-octatriene was fed to the still kettle in the amount of 250 p.p.m. based on the weight of glycidyl acrylate. The vapor temperature was 90° C. and the temperature in the still kettle 105° C. The glycidyl acrylate was refluxed for a period of 6 hours without formation of polymer anywhere in the distillation system.

In contrast to the above result, when glycidyl acrylate was refluxed under the above-described conditions without the addition of 2,6-dimethyl-2,4,6-octatriene to the system, polymer began to form in only 11 minutes. Similarly, when 50 p.p.m. of the monomethyl ether of hydroquinone was added to the system in place of the 2,6-dimethyl-2,4,6-octatriene, polymer formation began after 25 minutes.

*Example II*

Glycidyl acrylate was refluxed in a similar manner to that described in Example I using 5-methyl-1,3,5-heptatriene as the polymerization inhibitor. No polymer formed in the system during a period of 7 hours.

*Example III*

Glycidyl acrylate was refluxed in a similar manner to that described in Example I using cyclooctatetraene as the polymerization inhibitor. No polymer formed in the system during a period of 5½ hours.

In a similar manner, glycidyl methacrylate is refluxed without the formation of popcorn polymer by adding cyclooctatetraene as an inhibitor.

*Example IV*

Glacial acrylic acid was refluxed in a laboratory distillation column operated at an absolute pressure of 125 mm. of mercury and with a vapor temperature of 90° C. A reflux rate of approximately 500 ml. per hour was maintained and a solution consisting of 5 weight percent 2,6-dimethyl-2,4,6-octatriene and 5 weight percent monomethyl ether of hydroquinone in acrylic acid was fed to the top of the column at a rate of approximately 2.5 ml. per hour. The acrylic acid was refluxed for a total of 4 hours and at the end of this period only a trace of polymer was present in the distillation system.

Example V

Acrylic anhydride was distilled in a pilot plant scale distillation column operated with a column temperature varying from 45° C. at the top to 100° C. at the bottom and a kettle temperature of 80° C. to 100° C. A solution of 20 weight percent 2,6-dimethyl-2,4,6-octatriene and 20 weight percent monomethyl ether of hydroquinone in acrylic acid was fed to the top of the distillation column at a rate which provided 50 p.p.m. of each inhibitor based on the weight of acrylic anhydride charged to the column. A total of 43.5 lbs. of refined acrylic anhydride was recovered over a period of 4.5 hours without formation of polymer in the system.

In a similar manner, methacrylic anhydride is distilled without the formation of popcorn polymer in the distillation system.

Example VI

Distillation of 2-cyanoethyl acrylate was carried under the conditions described in Example V using 2,6-dimethyl-2,4,6-octatriene as the polymerization inhibitor. The 2,6-dimethyl-2,4,6-octatriene was fed to the top of the column at a rate sufficient to provide a concentration of 100 p.p.m. based on the weight of 2-cyanoethyl acrylate charged to the column. A total of 360 lbs. of refined 2-cyanoethyl acrylate was recovered over a period of 9 hours before traces of polymer appeared in the distillate.

In a similar manner, ethyl acrylate or ethyl methacrylate or 2-cyanoethyl methacrylate is distilled without the formation of popcorn polymer in the distillation system.

Example VII

Distillation of 2-hydroxyethyl acrylate was carried out in a laboratory distillation column operated at an absolute pressure of 1.0 mm. of mercury and a kettle temperature of 84° C. A 5 weight percent solution of 2,6-dimethyl-2,4,6-octatriene in 2-hydroxyethyl acrylate was added to the kettle at a rate sufficient to give 100 to 150 p.p.m. of 2,6-dimethyl-2,4,6-octatriene in the still overhead. A total of 762 grams of refined 2-hydroxyethyl acrylate was collected over a period of 2 hours and at the end of the distillation in the still system and kettle residues were found to be essentially free of polymer.

In contrast to the above result, an attempt to distill 2-hydroxyethyl acrylate in the same equipment without the addition of the conjugated polyene polymerization inhibitors of this invention resulted in rapid polymerization and the recovery of only a few grams of the distilled product.

The acrylic monomers refined by the method of this invention, that is by distillation wherein the hereinbefore described conjugated polyene polymerization inhibitors were used to prevent popcorn polymerization, were employed to prepare homopolymers and to prepare copolymers with various polymerizable comonomers and, in general, no adverse effects were noted due to the presence of the conjugated polyene polymerization inhibitor in the monomer. Thus, for example, glycidyl acrylate containing 100 p.p.m. of 2,6-dimethyl-2,4,6-octatriene was successfully copolymerized with vinyl acetate or vinyl chloride; homopolymerization of glacial acrylic acid containing 50 p.p.m. of cyclooctatetraene was accomplished with normal 97 to 98 percent conversion of monomer to polymer; and acrylic acid containing up to 200 p.p.m. of 2,6-dimethyl-2,4,6-octatriene was polymerized to polyacrylic acid with the reaction product having an identical total solids content and reduced viscosity as when acrylic acid that was free of the polymerization inhibitors of this invention was employed.

What is claimed is:

1. A method of stabilizing an acrylic monomer against popcorn polymerization during the distillation thereof, said acrylic monomer having the general formula:

$$H_2C=\underset{\underset{Y}{|}}{C}-\underset{\underset{}{\overset{O}{\|}}}{C}-O-X$$

wherein Y is selected from the group consisting of H and $CH_3$; X is selected from the group consisting of H, R,

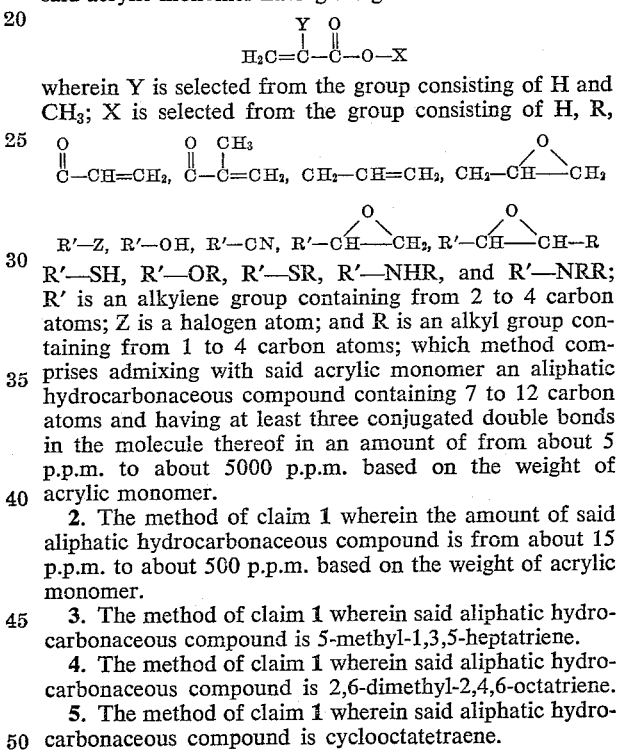

$R'$—SH, $R'$—OR, $R'$—SR, $R'$—NHR, and $R'$—NRR; $R'$ is an alkylene group containing from 2 to 4 carbon atoms; Z is a halogen atom; and R is an alkyl group containing from 1 to 4 carbon atoms; which method comprises admixing with said acrylic monomer an aliphatic hydrocarbonaceous compound containing 7 to 12 carbon atoms and having at least three conjugated double bonds in the molecule thereof in an amount of from about 5 p.p.m. to about 5000 p.p.m. based on the weight of acrylic monomer.

2. The method of claim 1 wherein the amount of said aliphatic hydrocarbonaceous compound is from about 15 p.p.m. to about 500 p.p.m. based on the weight of acrylic monomer.

3. The method of claim 1 wherein said aliphatic hydrocarbonaceous compound is 5-methyl-1,3,5-heptatriene.

4. The method of claim 1 wherein said aliphatic hydrocarbonaceous compound is 2,6-dimethyl-2,4,6-octatriene.

5. The method of claim 1 wherein said aliphatic hydrocarbonaceous compound is cyclooctatetraene.

No references cited.

WALTER A. MODANCE, *Primary Examiner.*

NICHOLAS S. RIZZO, *Examiner.*